United States Patent [19]
Kuwabara

[11] Patent Number: 5,557,644
[45] Date of Patent: Sep. 17, 1996

[54] SIGNAL DEMODULATING AND DECODING APPARATUS AND SIGNAL DEMODULATING AND DECODING METHOD

[75] Inventor: Takashi Kuwabara, Kodaira, Japan

[73] Assignee: Hitachi, Ltd., Tokyo, Japan

[21] Appl. No.: 210,568

[22] Filed: Mar. 18, 1994

[30] Foreign Application Priority Data

Apr. 7, 1993 [JP] Japan .................. 5-079979
Nov. 2, 1993 [JP] Japan .................. 5-274571

[51] Int. Cl.[6] .................. H03H 7/30; H03D 3/00; H03D 3/18; H04B 7/10
[52] U.S. Cl. .................. 375/340; 375/232; 375/233; 375/322; 375/327; 375/328; 375/330; 375/347; 455/337
[58] Field of Search .................. 375/5, 14, 94, 375/81, 78, 82, 86, 100, 216, 217, 232, 233, 322, 327, 328, 330, 347, 340; 455/337

[56] References Cited

U.S. PATENT DOCUMENTS

| | | | |
|---|---|---|---|
| 4,555,667 | 11/1985 | Cressey | 375/81 |
| 4,885,756 | 12/1989 | Fontanes | 375/82 |
| 5,173,925 | 12/1992 | Mizoguchi | 375/14 |
| 5,202,643 | 4/1993 | Sato | 375/82 |
| 5,283,531 | 2/1994 | Serizawa | 375/14 |
| 5,285,482 | 2/1994 | Sehier | 375/84 |
| 5,291,519 | 3/1994 | Tsurumaru | 375/100 |
| 5,291,522 | 3/1994 | Ueno | 375/94 |
| 5,311,546 | 5/1994 | Paik | 375/14 |
| 5,315,617 | 5/1994 | Guida | 375/94 |
| 5,335,251 | 8/1994 | Onishi | 375/100 |
| 5,376,894 | 12/1994 | Petranovich | 375/83 |

FOREIGN PATENT DOCUMENTS

| | | |
|---|---|---|
| 0366159A1 | 1/1987 | European Pat. Off. . |
| 60-68746 | 4/1985 | Japan . |
| 59-4250 | 10/1988 | Japan . |
| 63-269659 | 11/1988 | Japan . |
| 2-211745 | 8/1990 | Japan . |

OTHER PUBLICATIONS

Jacobsmeyer, Jay M. "An Adaptive Modulation Scheme for Bandwidth-Limited Meteor-Burst Channels," IEEE Military Communications Conference—MILCOM '88, Oct. 23–26, 1988, vol. 3, pp. 933,937. (English).

Primary Examiner—Stephen Chin
Assistant Examiner—Vijay Shankar
Attorney, Agent, or Firm—Fay, Sharpe, Beall, Fagan, Minnich & McKee

[57] ABSTRACT

In a signal demodulating and decoding apparatus, plural demodulators and decoders corresponding to plural modulation systems are provided respectively, and these are operated at the same time, and respective decoding results are outputted. Further, the signal demodulating and decoding apparatus evaluates decision error amounts of respective demodulators and selects the decoding data by the demodulator and the decoder having the least decision error amount. When an operation device for adaptively correcting the parameters used within the demodulator is provided so that decision errors on inputting the decision results of the demodulator into the decoder are made small, the decision error amount inputted to the operation device is selected in a manner similar to that above.

8 Claims, 9 Drawing Sheets

× DECISION SECTION INPUT VALUE
△ SIGNAL POINT OF MODULATION SYSTEM M1
○ SIGNAL POINT OF MODULATION SYSTEM M2
—·— DECISION THRESHOLD OF MODULATION SYSTEM M1
----- DECISION THRESHOLD OF MODULATION SYSTEM M2

SIGNAL DEMODULATING AND DECODING APPARATUS AND SIGNAL DEMODULATING AND DECODING METHOD

BACKGROUND OF THE INVENTION

The present invention relates to demodulation technique of modulated signals, further to particularly effective technique to be applied to demodulation and decoding of received signals in a MODEM having plural modulation systems, and for example effective technique to be utilized for a data communication MODEM or a digital picture data MODEM attached to a facsimile.

Conventionally, in a data communication apparatus such as a facsimile, in order to deal with plural modulation systems, an upper processor to control a modulator-demodulator by upper control protocol or application program changes operation mode of the modulator-demodulator into operation mode of a suitable modulation system every time.

SUMMARY OF THE INVENTION

In the above-mentioned method where the upper processor controls the modulator-demodulator, there is a problem that when received signals are demodulated, time is required before a suitable modulation system is settled. Further, when an operation system is provided so that produced error is evaluated by the decision during the demodulation and parameter of the demodulator is adaptively corrected, there is a problem as clarified by the present inventors that operation of the operation section must be interrupted before the modulation system is settled.

An object of the present invention is to provide signal demodulating and decoding technique that during signal reception in a MODEM or a communication apparatus having plural modulation systems, not by control from the upper processor, a modulation system can be settled rapidly and stably.

Outline of a representative invention disclosed in the present patent application will be briefly described as follows.

Demodulating means and decoding means are provided for demodulating and decoding operation depending upon plural modulation systems respectively, and operation means is provided for evaluating respective decision error amounts. Further, selection means for selecting respective decoding data using the evaluation results is provided, and selection means for selecting the decision error is provided when outputs of respective demodulating means are supplied to respective decoding means.

According to the above-mentioned means, at first, when respective decision error amounts are evaluated in plural demodulating means, the modulation system in the demodulating means having the least decision error amount is the correct modulation system. Consequently, the decision error amounts of all demodulating means are always evaluated, and output of the decoding means corresponding to the output of the demodulating means having the least decision error amount is outputted to the upper processor or the like. By adopting this method, the correct modulation system of a received signal can be selected in a moment.

Further, the decision error amount of the demodulating means selected by the above-mentioned means is supplied adaptively to the operation means for correcting the parameter of the demodulating means. By adopting this method, the correct decision error amount can be provided to the operation means thus the operation means can be always operated correctly.

DESCRIPTION OF THE PREFERRED EMBODIMENTS

Figure 1:
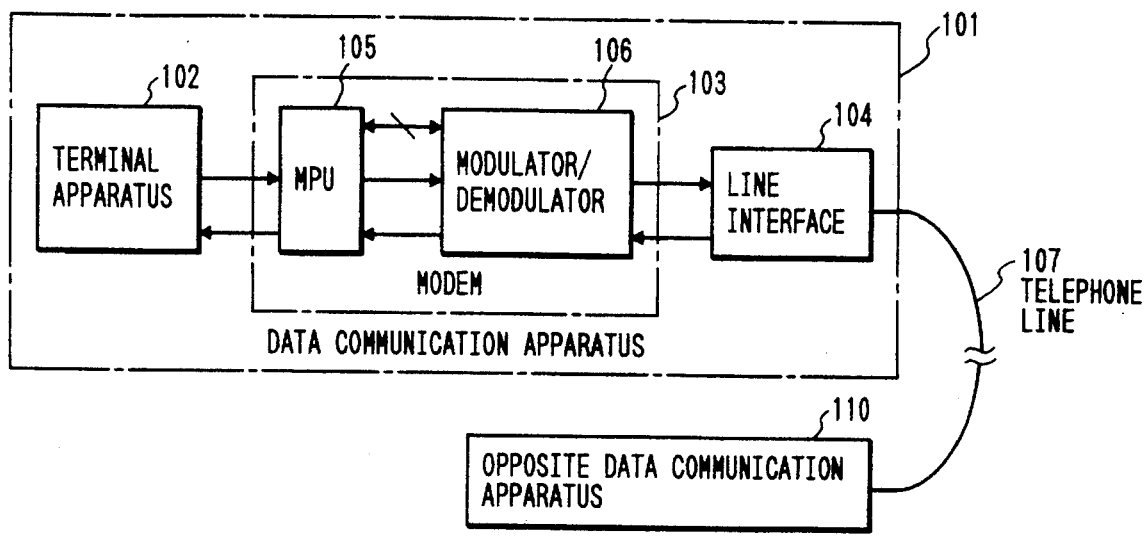
FIG. 1 is a block diagram showing a system constitution example of a data communication apparatus to which a signal demodulating and decoding apparatus or a signal demodulating and decoding method according to the invention is suitably applied.

FIG. 1 shows a system constitution example of a data communication apparatus to which a signal demodulating and decoding apparatus or a signal demodulating and decoding method according to the present invention is suitably applied.

The data communication apparatus 101 of this system is constituted by a terminal apparatus 102 such as a personal computer, a MODEM 103, and a line interface 104 comprising a transformer, an amplifier and the like. Further the MODEM 103 is constituted, for example, by a MPU (microprocessor) 105 and a modulator-demodulator 106.

When data are transmitted, the MPU 105 within the MODEM 103 receives transmitted data from the terminal apparatus 102 and carries out data processing and then inputs the data to the modulator-demodulator 106. In the modulator-demodulator 106, the transmission data being inputted are coded and modulated and then sent through the line interface 104 and the telephone line 107 to an opposite data communication apparatus 110.

On the other hand, data sent from the opposite data communication apparatus 110 are inputted as reception data to the data transmission apparatus 101 through the telephone line 107. In the data communication apparatus 101, the reception data are inputted through the line interface 104 to the modulator-demodulator 106 within the MODEM 103. In the modulator-demodulator 106, the reception data are demodulated and decoded and then are inputted to the MPU 105. The MPU 105 carries out data processing and then inputs the reception data to the terminal apparatus 102.

In this connection, the opposite data communication apparatus 110 is constituted similarly to the data communication apparatus 101, and comprises a terminal apparatus such as a personal computer, a MODEM and a line interface 104.

In this embodiment, the modulator-demodulator 106 can deal with two modulation systems, modulation system M1 and modulation system M2. Here, the two modulation systems are, for example, four-phase differential phase modulation system (hereinafter referred to as "modulation system M1") with transfer speed being 1200 bps and 16-point orthogonal amplitude modulation system (hereinafter referred to as "modulation system M2") being different from the modulation system M1 in the signal point arrangement and the transfer speed. The transfer speed of the modulation system M2 is 2400 bps. In this connection, in the modulator-demodulator 106 of this embodiment, both the modulation system M1 and the modulation system M2 have the carrier frequency being 2400 Hz or 1200 Hz and the modulation speed being 600 Hz.

Figure 2:
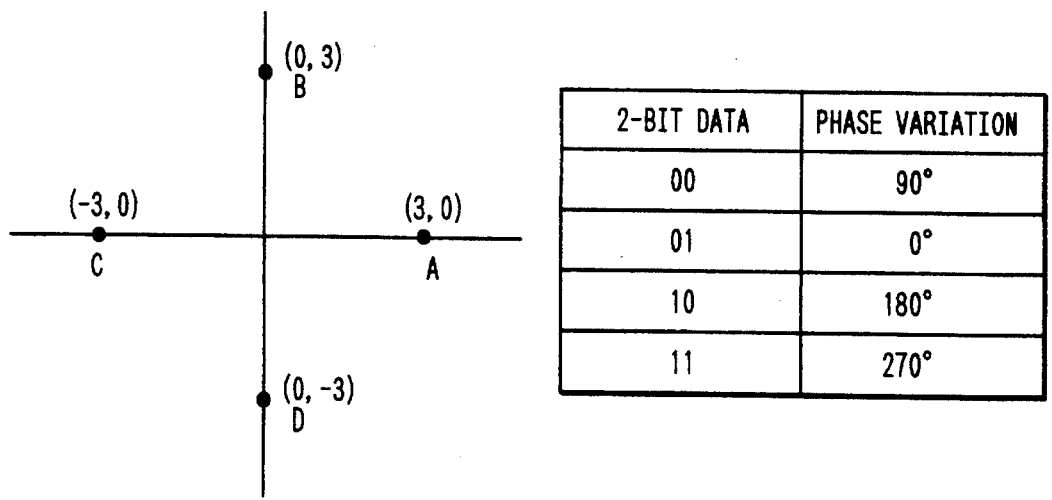
FIG. 2 is an explanatory diagram showing signal point arrangement and coding system in modulation system M1.
Figure 3:
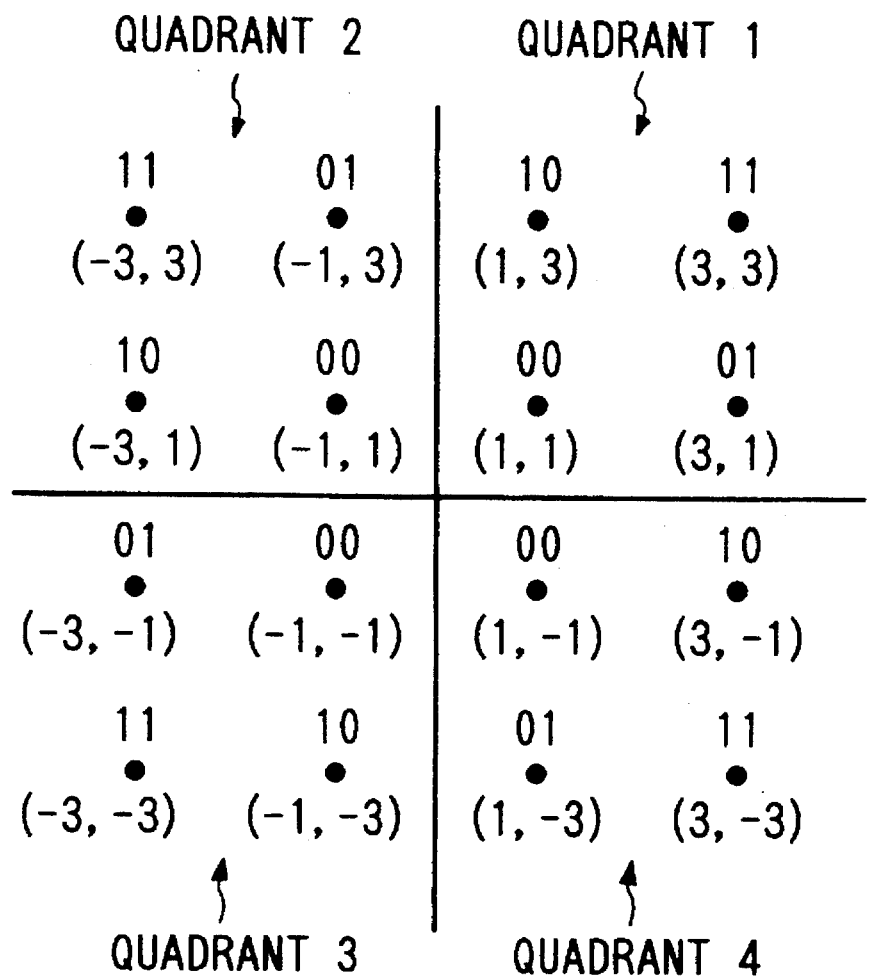
FIG. 3 is an explanatory diagram showing signal point arrangement and coding system in modulation system M2.

FIG. 2 shows signal point arrangement and coding system in the modulation system M1, and FIG. 3 shows signal point arrangement and coding system in the modulation system M2. Since the modulation systems M1 and M2 are known modulation systems, the detailed description shall be omitted. The modulation system M1 is advantageous in that the transfer speed is slow but the reliability is high in comparison with the modulation system M2. On the contrary, the modulation system M2 is advantageous in that the reliability is low but the transfer speed is fast in comparison with the modulation system M1. Therefore changing from the modulation system M1 to the modulation system M2 may be carried out at the midway of the transfer. The modulator-demodulator 106 of this embodiment is constituted so that even if the modulation system is changed at the midway of the reception data, the changing is detected automatically and the accurate demodulation and decoding can be carried out.

Figure 4:
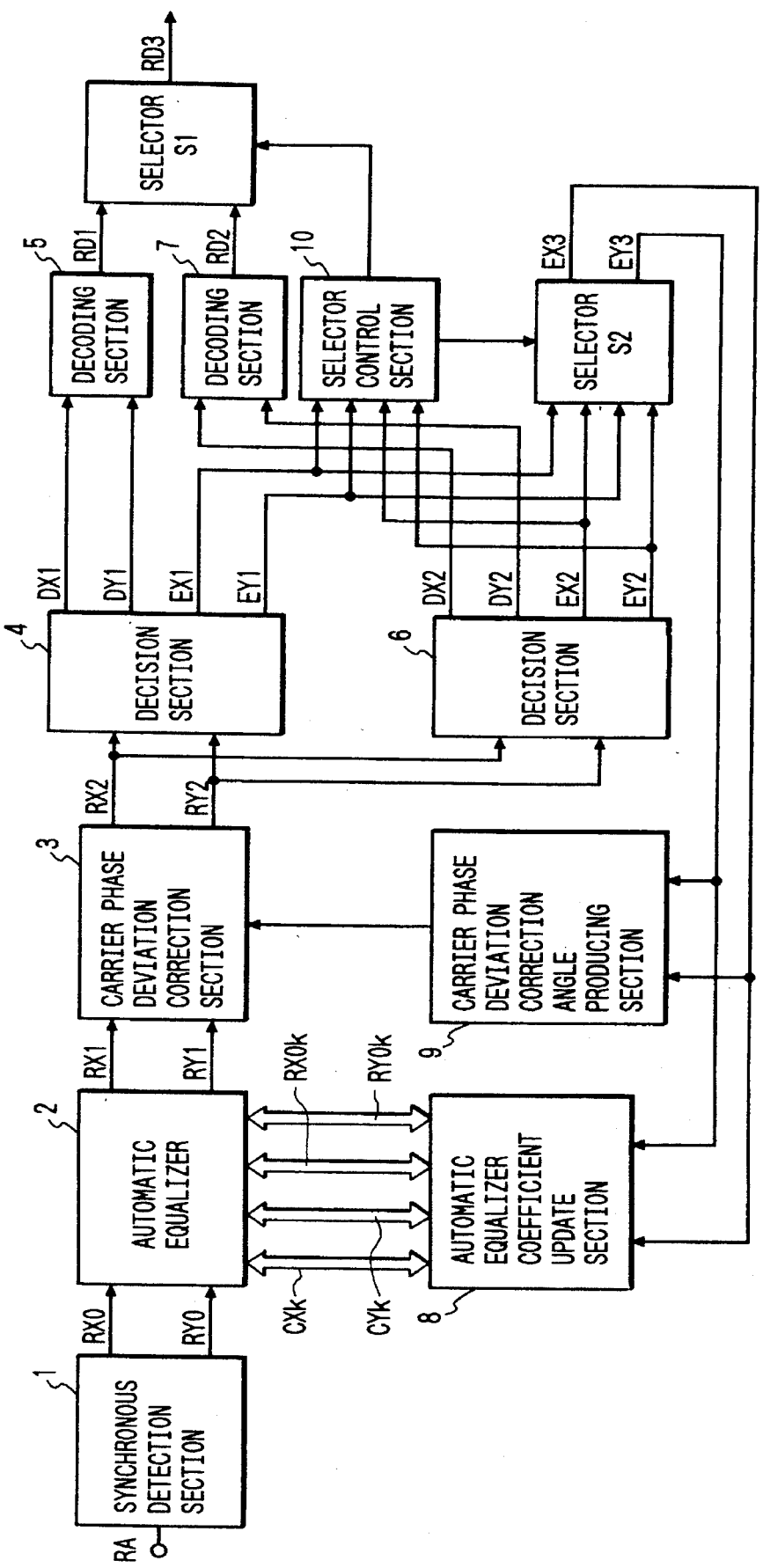
FIG. 4 is a block diagram of an embodiment when a modulator-demodulator 106 is realized in hardware.

FIG. 4 shows a block diagram of an embodiment where the modulator-demodulator 106 is realized in hardware.

In the modulator-demodulator 106 of this embodiment, at first, in a synchronous detection section 1, synchronous detection by carrier frequency is carried out for a received modulation signal RA and detection outputs (RX0, RY0) of two channels are obtained. The obtained detection outputs are sent to an automatic equalizer 2. The automatic equalizer 2 is constituted by an FIR (finite length impulse response circuit) of two channels having detection output data columns RX0k, RY0k (k=1−n) of two channels as inputs and having variable coefficient vector columns CXk, CYk (k=1−n), and obtains outputs (RX1, RY1) eliminating intercode interference due to line distortion or the like by processing according to following formula (1). Where n represents the tap number in the FIR of the automatic equalizer 2.

$$RX1 = \sum_k CXk \cdot RX0k - \sum_k CYk \cdot RY0k \quad (1)$$

$$RY1 = \sum_k CXk \cdot RY0k + \sum_k CYk \cdot RX0k$$

The outputs (RX1, RY1) from the automatic equalizer 2 are supplied to a carrier phase deviation correction section 3. The carrier phase deviation correction section 3 is constituted by rotational operator by correction angle θ, and obtains outputs (RX2, RY2) compensating the jitter and the frequency offset in the carrier for the outputs (RX1, RY1) from the automatic equalizer 2 and supplies the obtained outputs to decision sections 4 and 6. The automatic equalizer 2, the carrier phase deviation correction section 3 and the decision sections 4 and 6 constitute a demodulation section.

The decision section 4 carries out two-dimensional decision by the modulation system M1 based on the outputs (RX2, RY2) from the carrier phase deviation correction section 3, and obtains two-dimensional decision results (DX1, DY1) and decision error vectors (EX1, EY2) and supplies the two-dimensional decision results (DX1, DY1) to a decoding section 5. The decision section 6 carries out two-dimensional decisional by the modulation system M2 based on the outputs (RX2, RY2) from the carrier phase deviation correction section 3, and obtains two-dimensional decision results (DX2, DY2) and decision error vectors (EX2, EY2) and supplies the two-dimensional decision results (DX2, DY2) to a decoding section 7.

Figure 10:
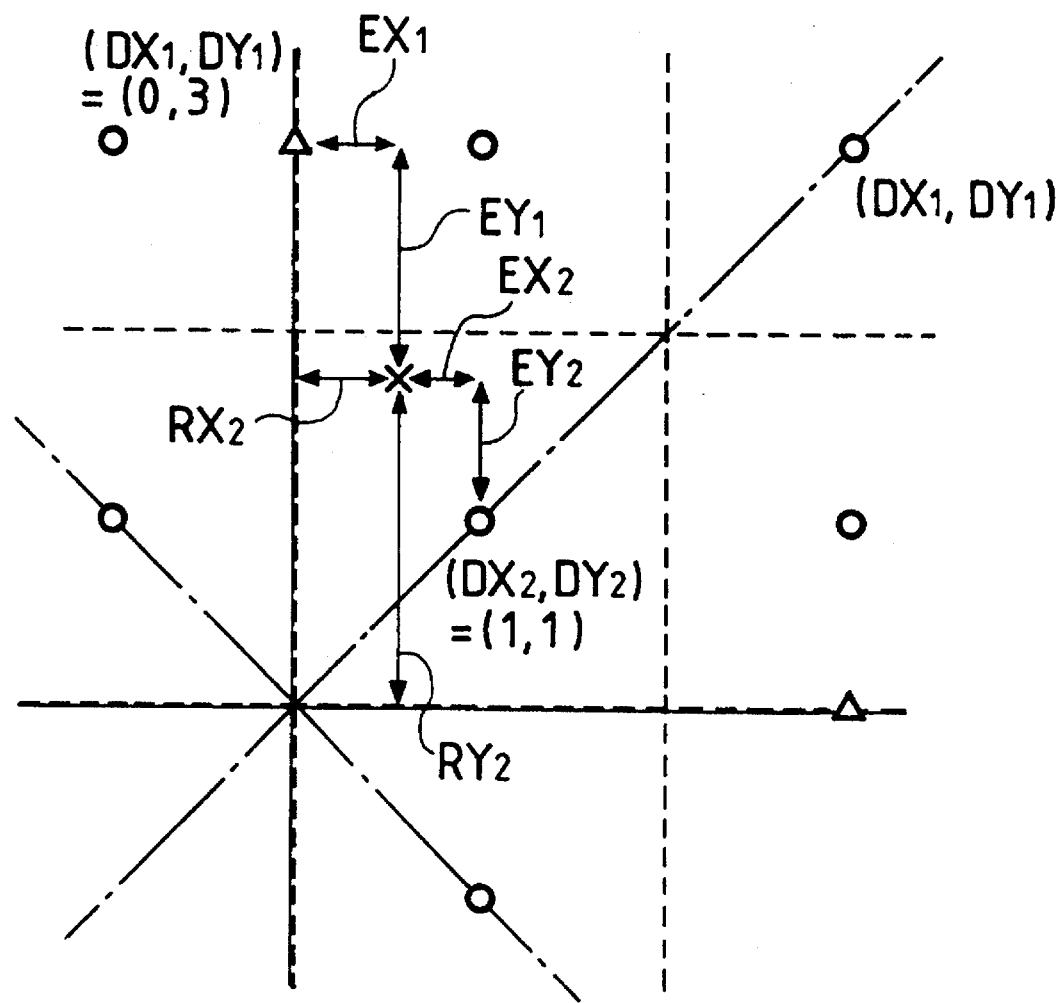
FIG. 10 is an explanatory diagram showing relation of decision section inputs (RX2, RY2) and signal point in each modulation system and decision errors (EX1, EY1), (EX2, EY2).

FIG. 10 shows relation of the decision section inputs (RX2, RY2) and signal points and decision errors (EX1, EY1), (EX2, EY2) in each modulation system.

In the decoding section 5, decoding result RD1 is obtained from the two-dimensional decision results (DX1, DY1). Also in the decoding section 7, decoding result RD2 is obtained from the two-dimensional decision results (DX2, DY2).

Either the decoding result RD1 or the decoding result RD2 is selected by a selector S1 operated selectively by a control signal from a selector control section 10, and is outputted as final decision result RD3 through a descrambler (not shown) to a MPU 105 as upper processor.

On the other hand, the decision error vectors (EX1, EY1) obtained in the decision section 4 and the decision error vectors (EX2, EY2) obtained in the decision section 6 are supplied to a selector S2 operated selectively by a control signal from the selector control section 10, and any of these is supplied as decision error vectors (EX3, EY3) to an automatic equalization coefficient update section 8 and a carrier phase deviation correction angle producing section 9.

In the automatic equalizer update section 8, since vector produced between the decision error vectors (EX3, EY3) and the detection output data columns (RX0k, RY0k) is multiplied by constant and added to variable coefficient vector columns (CXk, CYk), coefficient of the automatic equalizer 2 is updated. Also in the carrier phase deviation correction angle producing section 9, angle component of the decision error is extracted from the decision error vectors (EX3, EY3), and correction angle F to be supplied to the carrier phase deviation correction section 3 is produced.

Further in the selector control section 10, the absolute values E1 (=EX1×EX1+EY1×EY1) and E2 (=EX2×EX2+EY1×EY1) of the decision error are compared regarding which is larger. Among the two modulation systems M1, M2, the modulation system with smaller value of the decision error is recognized as a modulation system of a received signal, and the selector S1 and the selector S2 are controlled so that two-dimensional decision results and decision error vectors corresponding to the recognized modulation system are selected respectively. In such constitution, a suitable modulation system of a received signal can be selected immediately after decision of the demodulation data. For example, in FIG. 10, since the signal point (1, 1) is the nearest (small error) to the input (RX2, RY2), the modulation system M2 is recognized as the correct modulation system.

Further in the modulator-demodulator 106 of this embodiment, selection of decision results and selection of decision error vectors are carried out independently. That is, selection of the decision error vectors is always carried out in every decision operation of the two decision sections 4, 6, and selection of the decision results is carried out after the reception data columns are evaluated and recognized to be reasonable as reception data. In such constitution, the automatic equalizer 2 and the carrier phase deviation correction section 3 can be operated stably, and meaningless reception data due to the decision error can be prevented from being outputted to the upper processor.

FIGS. 5–8 show embodiments when the modulator-demodulator 106 is realized by a DSP (digital signal processor) and its software.

Figure 5:
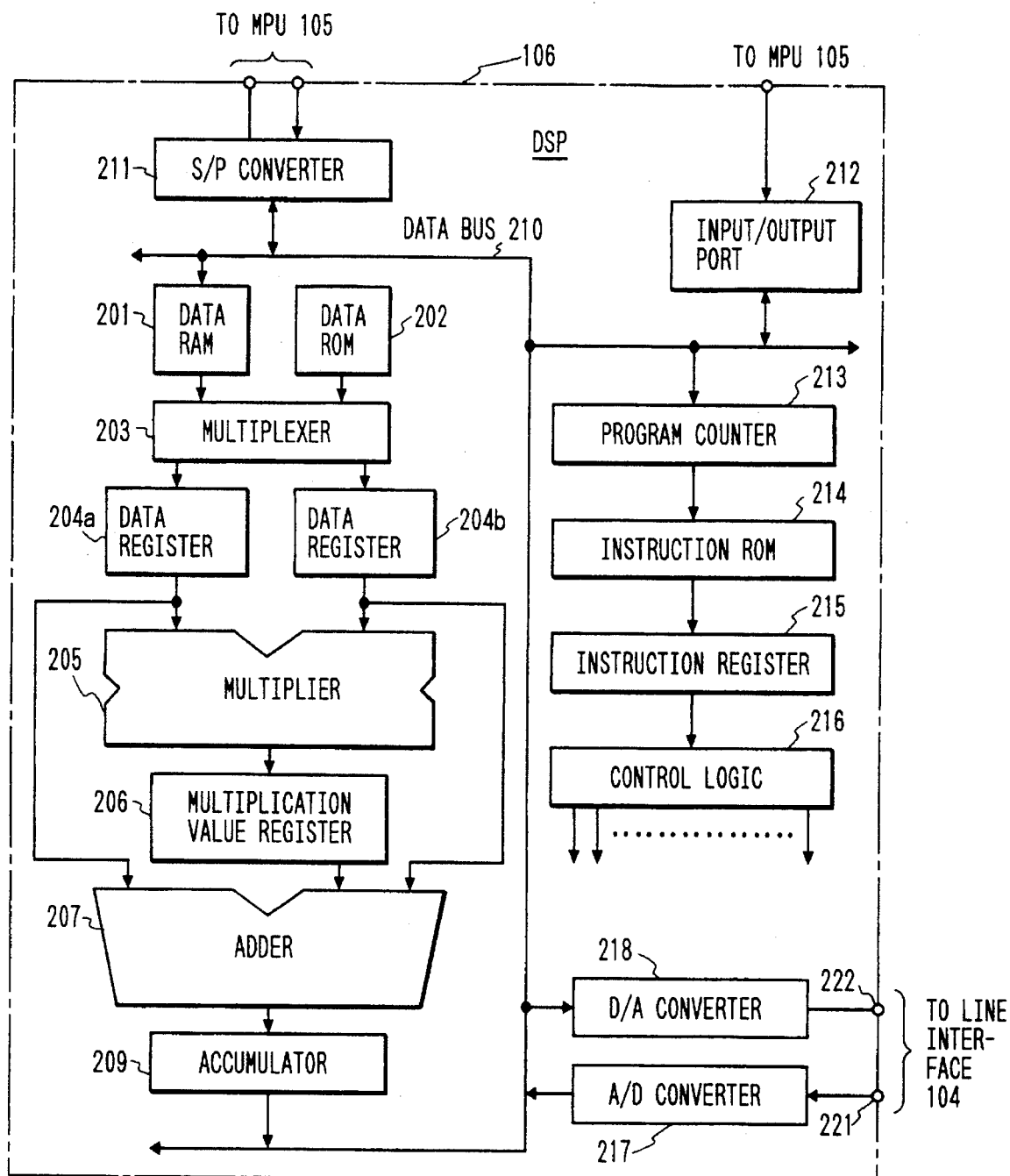
FIG. 5 is a block diagram of an embodiment of a DSP used when a modulator-demodulator 106 is realized in a DSP (digital signal processor) and its software.

Among them, FIG. 5 shows a constitution example of a DSP as hardware. Although not particularly limited thereto, the DSP is constituted similarly to a general-purpose DSP. That is, the DSP 106 contains a data RAM 201 storing data to be operated and a data ROM 202 storing coefficients to be used for prescribed operation, and data to be operated (including reception data and transmission data) and coefficients stored in the data RAM 201 and the data ROM 202, are supplied through a multiplexer 203 to data registers 204a, 204b and further supplied from the registers to a multiplexer 205.

Operation results in the multiplexer 205 are once held to a multiplication value register 206 and supplied to an adder 207 having adding and subtracting function. Operation results calculated in the adder 207 are once held to an accumulator 209 and stored through a data bus 210 into the data RAM 201.

Also the data bus 210 can input or output commands and data between it and an external MPU 105 through an input/output port 212, and a serial/parallel converter 211 is connected to the data bus 210 and transmission/reception data are transferred between the data bus 210 and the external MPU 105 through the serial/parallel converter 211.

Further within the DSP 106, an instruction ROM 214 storing microprograms is installed so that data are transferred between the accumulator 209 and the data RAM 201 and the multiplier 205, the adder 207 and the like are operated according to prescribed operation algorithm.

In the instruction ROM 214, reading of micro instruction is carried out by a program counter 213. The micro instruction being read out is held to an instruction register 215 and supplied to a control logic 216. The control logic 216 decodes the micro instruction, and forms various sorts of control signals and next address of the instruction ROM in suitable timing and supplies them to parts within the processor, such as the multiplier 206, the adder 208 or the like so as to operate these parts sequentially. Thereby desirable data processing is executed.

Further within the DSP 106 as modulator-demodulator, an A/D converter 217 and a D/A converter 218 are contained and connected to the data bus 210 so that data can be inputted or outputted between the data bus 210 and the operation section comprising the multiplier 205 or the like. Consequently, reception signals inputted from the communication line to a reception input terminal 221 are converted into digital signals by the A/D converter 217 and then outputted to the data bus 210. On the other hand, transmission data are coded and modulated in the operation section and then supplied through the data bus 210 to the D/A converter 218, where the data are converted into analog signals and outputted from a transmission output terminal to the communication line.

Also the MPU 105 controls the modulator-demodulator 106 according to the command control through the data bus. The command code from the MPU 105 is fetched through the input/output port 212 to the data RAM 201, and is analyzed by microprogram within the instruction ROM 214 and executed.

Figure 6:
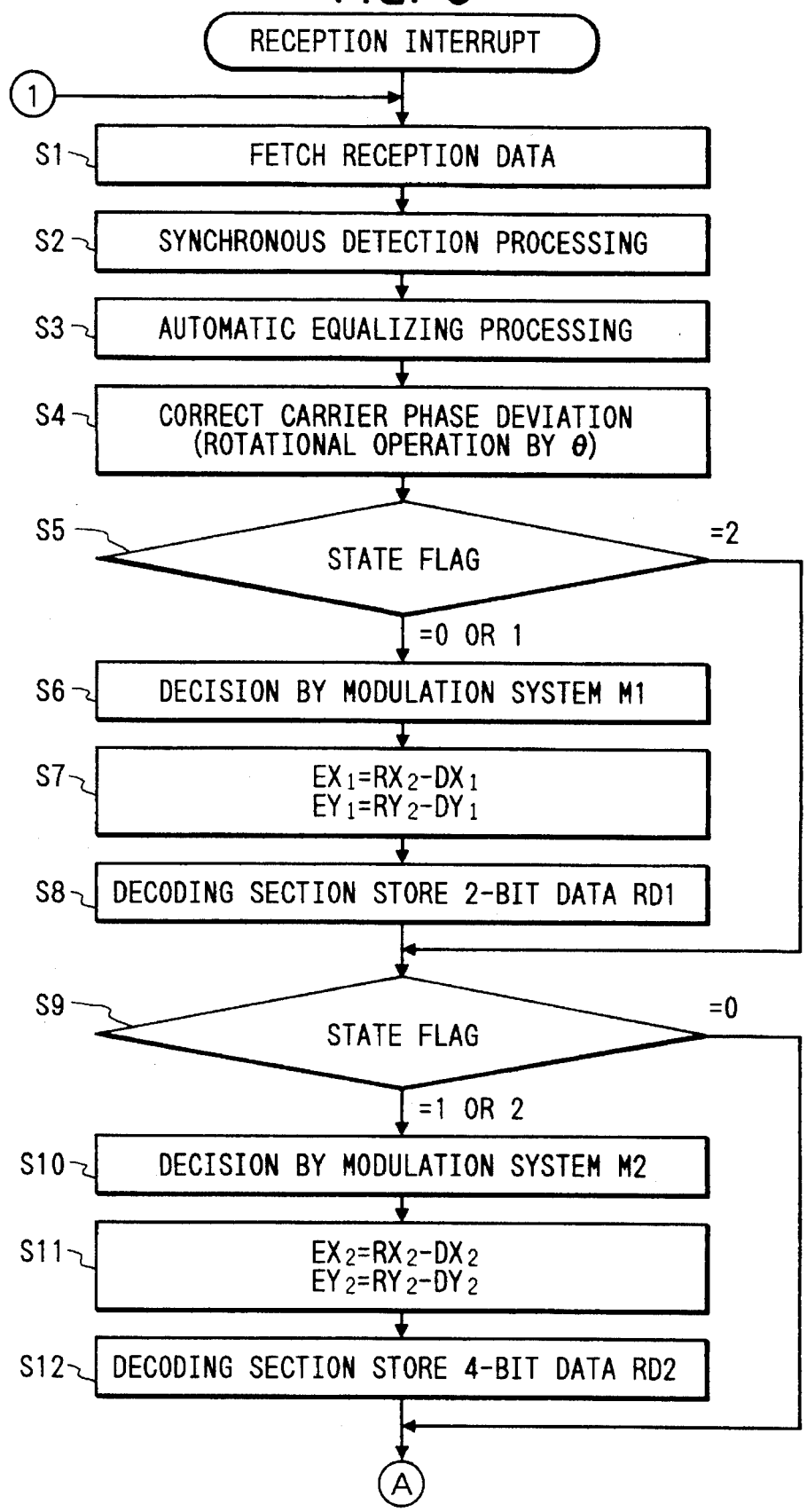
FIG. 6 is a flow chart (first half) showing an example of procedure of reception processing executed by a modulator-demodulator (DSP)

FIG. 6 shows reception processing flow executed by the instruction ROM 214. The reception processing flow is started, for example, by interrupt generating in response to that reception signals enter the D/A converter 217.

In this reception processing flow, at first, outputs (reception data) RA from the A/D converter 217 are fetched to the data RAM 201, and then synchronous detection processing is carried out (steps S1, S2). In other words, demodulation by the carrier frequency is carried out, and demodulation outputs RX0, RY0 of two channels are obtained. Next, demodulation output data columns RX0k, RY0k (k=1–n) of two channels are used as inputs, and outputs RX1, RY1 eliminating the intercode interference due to the line distortion or the like are obtained by automatic equalizing processing according to the formula (1) as above described (step S3).

In next step S4, rotational operation is carried out to the operation results RX1, RY1 of automatic equalizing processing by the correction angle θ according to following formula (2), and the carrier phase deviation correction is carried out. That is, values RX2, RY2 compensating the jitter in the carrier and the frequency offset to the automatic equalizing processing results RX1, RY1 are obtained.

$$RX2 = RX1 \cdot \cos\theta - RY1 \cdot \sin\theta \quad RY2 = RY1 \cdot \sin\theta + RX1 \cdot \cos\theta \quad (2)$$

The above-mentioned steps S2, S3, S4 correspond respectively to the synchronous detection section 1, the automatic equalizer 2 and the carrier phase deviation correction section 3 in the embodiment of FIG. 4.

Next, in step S5, check of state flag is first carried out. If the state flag is "2", any processing is not executed and process is moved to step S9. On the other hand, if the state flag is "0" or "1", two-dimensional decision by the modulation system M1 is carried out to the carrier phase deviation correction values RX2, RY2 (step S6), and decision results DX1, DY1 and decision error vectors EX1 (=RX2−DX1), EY1 (=RY2−DY1) are obtained (step S7). And then, in step S8, two-bit data RD1 are obtained from the above-mentioned decision results DX1, DY1 and stored in the data RAM 201. The above-mentioned steps S5–S7 correspond to the decision section 4 in the embodiment of FIG. 4, and the above-mentioned step S8 corresponds to the decoding section 5 of FIG. 4.

Figure 7:
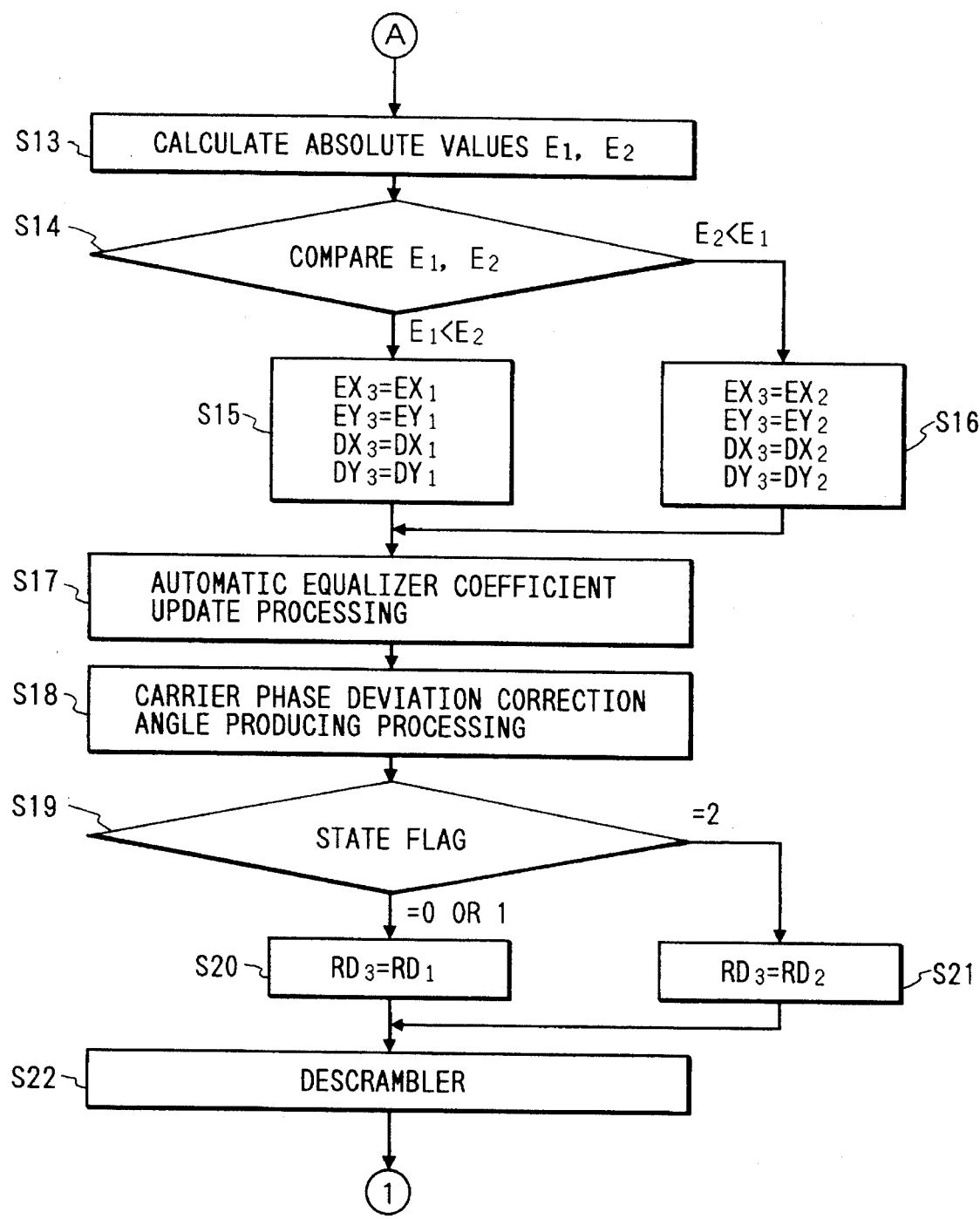
FIG. 7 is a flow chart (latter half) showing an example of procedure of reception processing executed by a modulator-demodulator (DSP)

When step S8 is finished, process advances to step S9 and check of the state flag is carried out again If the state flag is "0", any processing is not executed and process is moved to step S13 of FIG. 7. On the other hand, if the state flag is "1" or "2", process advances to step S10, and two-dimensional decision by the modulation system M2 is carried out to the carrier phase deviation correction values RX2, RY2 and decision results DX2, DY2 and decision error vectors EX2 (=RX2−DX2), EY2 (=RY2−DY2) are obtained (steps S10, S11). And then, in step S12, four-bit data RD2 are obtained from the decision results DX2, DY2 and stored in the data RAM 201. The above-mentioned steps S9–S11 correspond to the decision section 6 in the embodiment of FIG. 4, and the above-mentioned step S12 corresponds to the decoding section 7 in the embodiment of FIG. 4.

When step S12 is finished, process advances to step S13 of FIG. 7 and the absolute value E1 (=EX1×EX1+EY1×

EY1) of decision error vector and the absolute value E2 (=EX2×EX2+EY2×EY2) of decision error vector are operated, and then in next step S14, the absolute values E1 and E2 are compared regarding which is larger, and among the two modulation systems M1, M2, a modulation system with smaller absolute value of the decision error vector is selected, and the decision results corresponding to the selected modulation system are stored as (DX3, DY3) and the selected decision error vectors are stored as (EX3, EY3) respectively in the data RAM 201 (steps S15, S16). The above-mentioned step S13 corresponds to the selector control section 10 in the embodiment of FIG. 4, and the steps S14–S16 correspond to the selector 2 in the embodiment of FIG. 4.

In next step S17, operation is carried out according to following formula (3) and variable coefficients CXk, CYk (vector columns) in the automatic equalizing processing (formula 1) are updated. Where g is constant adjusted suitably. The step S18 corresponds to the automatic equalizer coefficient update section 8 in the embodiment of FIG. 4.

$$CXk=CXk-g(EX3 \cdot RX0k+EY3 \cdot RY0k) \quad CYk=CYk-g(EY3 \cdot RX0k+EX3 \cdot RY0k) \quad (3)$$

In next step S18, angle component of the decision error is extracted from the decision results DX3, DY3 and the decision error vectors EX3, EY3, and the correction angle θ in the carrier phase deviation correction processing (step S4) is produced. The step S18 corresponds to the carrier phase deviation correction angle producing section 9 in the embodiment of FIG. 4.

And then in step S19, check of the state flag is carried out. If the state flag is "0" or "1", decoding results RD1 are selected, and if the state flag is "2", decoding results RD2 are selected and stored as the final decoding results RD3 in the data RAM 201 (steps S20, S21). And then in step S22, the decoding results RD3 are made input data, and descrambler processing is executed in that scramble coded data are returned to the original code and reception data columns RD are produced. As a result, reception data demodulated in suitable modulation system are outputted immediately after decision of the demodulation data.

Figure 8:
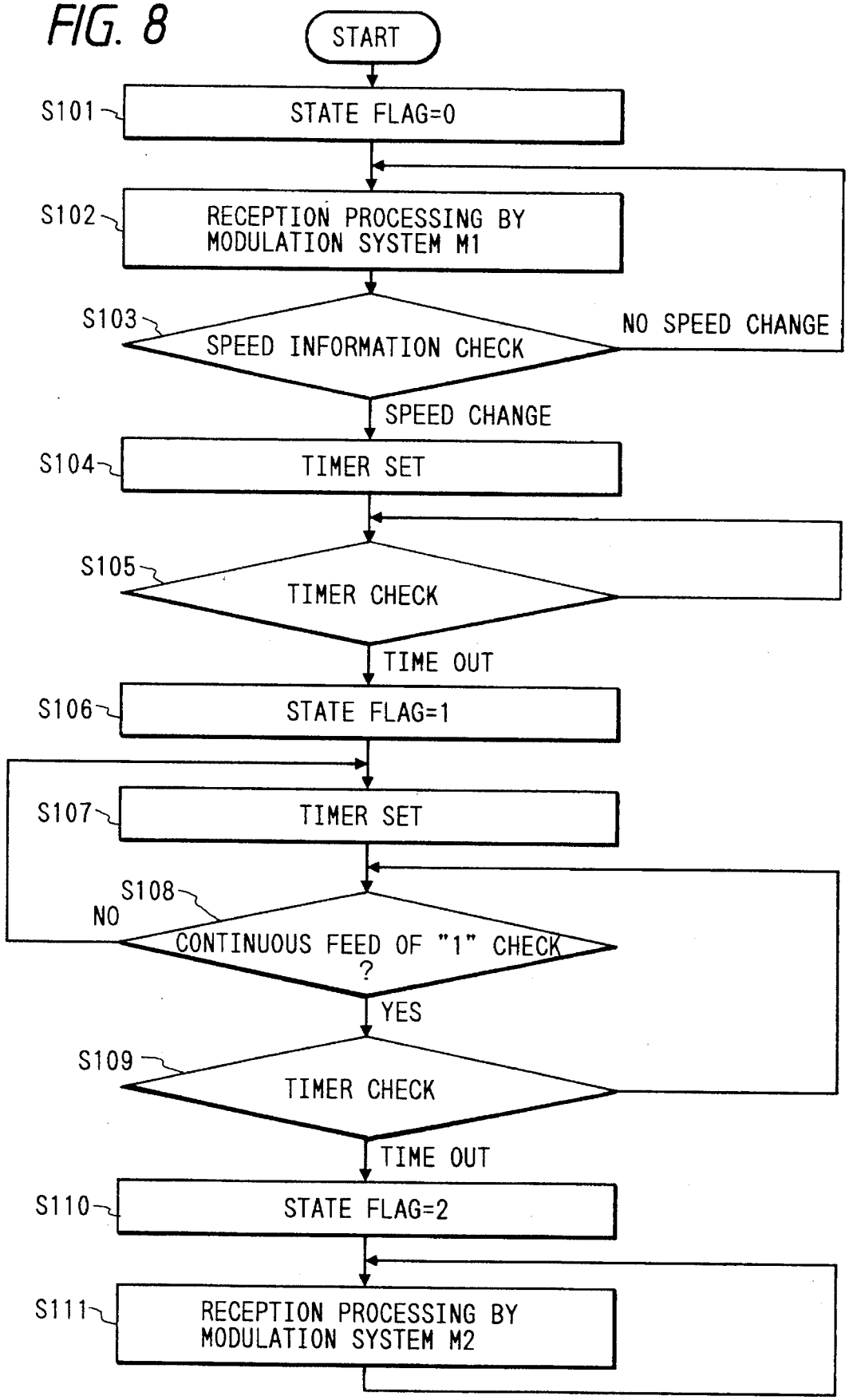
FIG. 8 is a flow chart showing an example of procedure controlling transition of state flag.
Figure 9:
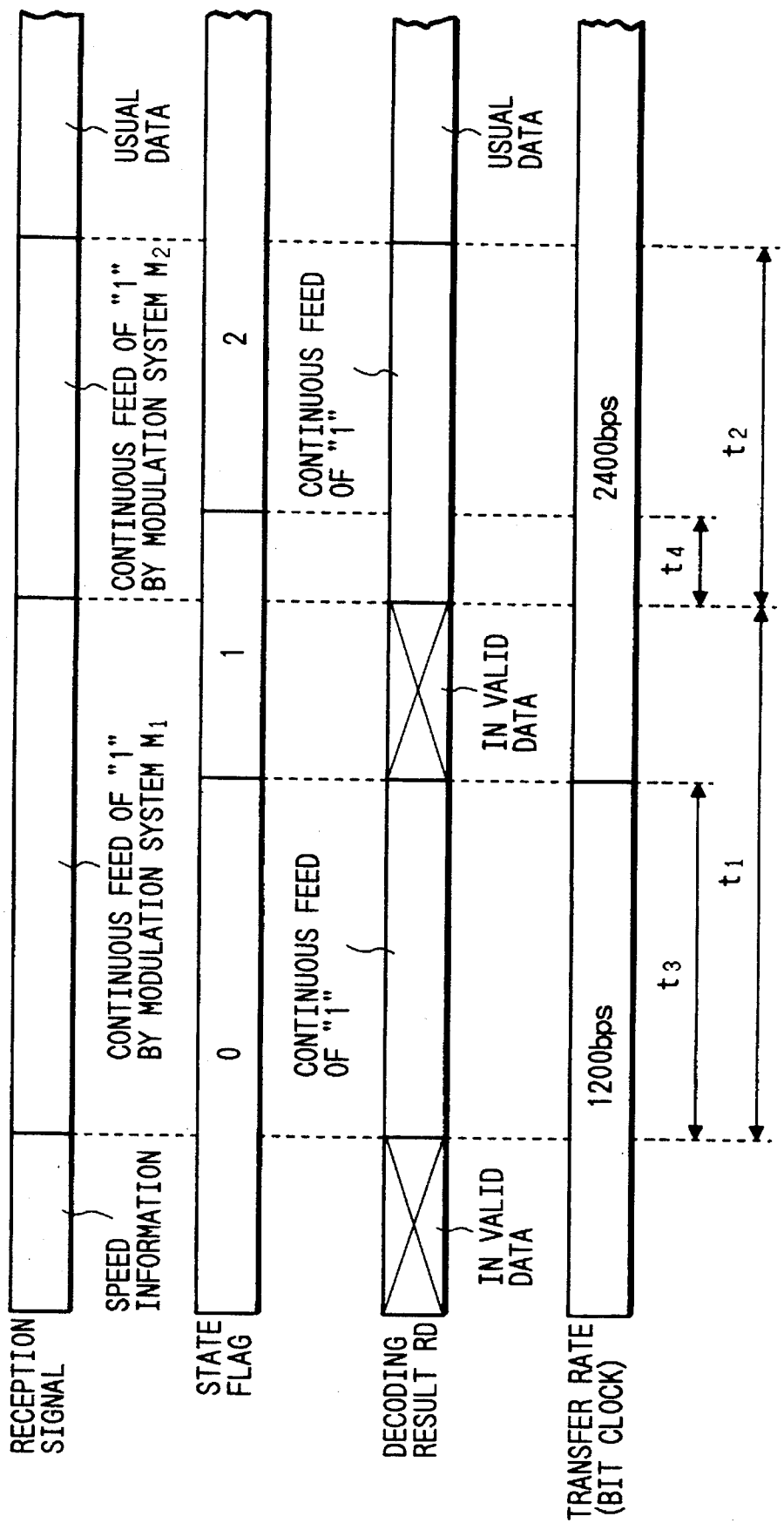
FIG. 9 is an explanatory diagram showing relation between speed change procedure during communication and state flag.

FIG. 9 explains relation between variation of reception signals at speed change during communication and transition of a state flag used within the reception processing flow, and FIG. 8 shows an example of procedure controlling the transition of the state flag (control flow) in the modulator-demodulator (DSP) 106. The control flow is carried out not in the interrupt processing but in the main processing of the DSP.

The state flag is constituted by two bits. If the state flag is "0", it is indicated that processing by the modulation system M1 is carried out, and also if the state flag is "1", it is indicated that the modulation system is being changed, and further if the state flag is "2", it is indicated that processing by the modulation system M2 is carried out. The control flow assumes the case that the speed change information is included in the reception data.

The case that, at first, communication is carried out in the modulation system M1 of transfer speed 1200 bps and then the communication system is changed into the modulation system M2 of transfer speed of 2400 bps, will be described as follows.

In this case, at first, the reception signals are data of the modulation system M1, and then patterns including the speed change information (continuous patterns of data "1" by the modulation system M1) P1 are first transmitted during changing of the communication system. After a lapse of the prescribed time t1, changing to the modulation system M2 is carried out and continuous patterns P2 of data "1" are transmitted. FIG. 8 shows variation of reception signals after the speed change information and transition of the state flag, and data by the modulation system M1 are transmitted before the speed change information.

Consequently, in the modulator-demodulator 106 at the reception side, the initial state flag is set to "0" (step S101), and receiving processing by the modulation system M1 and check of the speed change information are repeated (steps S102, S103). If patterns including the speed change information are detected in step S103, the timer is set to the prescribed time t3 (<t1) and started (step S104). If the timer becomes time out, the state flag is set to "1" (steps S105, S106).

Thereby according to the reception interrupt flow of FIG. 6, decisions by both systems, the modulation system M1 and the modulation system M2, are carried out concurrently, i.e., at the same time. During this process, selection of the decision of the error (steps S14–S16) is carried out by evaluating suitable error vectors by two decision processings (steps S6–S8, steps S9–S11).

On the other hand, in the control flow of FIG. 8, after the state flag is set to "1", in step S107, the timer is set to the specified time t4 (<t2) and started, and the reception signals are supervised and continuous feed of "1" during changing is checked (step S108). More specifically, in this case, since decision results by the modulation system M1 are inputted to the descrambler processing (step S22 of FIG. 7) of the reception interrupt flow, outputs of the descrambler are supervised and the continuous feed of "1" is detected, and if "1" is detected continuously during the prescribed time T4, the state flag is set to "2" (steps S108–S110). Then the modulation system has been changed from M1 completely. Since then, the reception processing by the modulation system M2 is repeated (step S111). From this reception processing, process is returned to step S101 by the reset input from the MPU 105.

Thus in the demodulating and decoding processing of FIGS. 6–8, since the state flag is controlled (changed) based on the speed change information included in the reception data and the demodulating and decoding processing is carried out in response to the content of the state flag, the wrong selection of the modulation system due to noise or the like is avoided and demodulation results by the exact modulation system can be obtained.

In the above-mentioned embodiment, although the state flag is allocated by two bits and is controlled (changed) based on the speed change information representing the three contents, in place of the speed change information, the modulation system may be selected by comparing two-dimensional decision results by each modulation system and the state flag may be controlled. In this case, the state flag can be constituted by one bit.

Since the embodiment as above described is provided with demodulating means and decoding means carrying out demodulating and decoding operation depending upon plural modulation systems respectively, and with operation means evaluating respective decision error amounts, and further with selection means selecting respective decoding data using the evaluation results and selection means selecting the decision errors when outputs of the demodulating means are supplied to the decoding means respectively, when respective decision error amounts are evaluated in plural demodulating means, as the modulation system in the demodulating means having the least decision error amount is the correct modulation system, the decision error amounts of all demodulating means are always evaluated and output of the demodulating means having the least decision error amount is supplied to the decoding means, so that there is effect that the correct modulation system can be selected in a moment and the correct demodulation result can be obtained.

Further since the decision error amount of the correct demodulating means selected by the above-mentioned method is supplied adaptively to the operation means correcting the parameter of the demodulating means, there is effect that the correct decision error amount can be provided to the operation means thus the operation means can be always operated correctly.

Although the invention done by the present inventors has been described specifically based on the embodiments, the present invention is not limited by the embodiments but various changes and modifications may be made in the invention, of course, without departing from the spirit and scope thereof. For example, constitution to deal with two modulation systems, the modulation system M1 and the modulation system M2, is shown in the embodiments, but constitution to deal with three or more modulation systems is possible. Also in the embodiments, although the communication system using a four-phase differential phase modulation system being a sort of orthogonal amplitude modulation system and a 16-point orthogonal amplitude modulation system as modulation systems has been exemplified, the present invention is not limited to this but can be applied to a MODEM in a communication system using other modulation system.

Effects obtained by a representative invention disclosed in the present invention will be briefly described as follows.

Since the correct modulation system of received data can be rapidly detected from the decision results of the demodulating means, the demodulating and decoding operation including correcting operation and line equalizing operation can be held stable. Also when the modulation system is varied continuously during reception, this can be followed rapidly.

Further since modulation systems are changed entirely in the demodulating and decoding section, in the upper processor, not being troubled by changing processing of modulation systems, the processing time may be spent entirely for control of the upper protocol and the application program, and the throughput of the system is improved.

What is claimed is:

1. A signal demodulating and decoding apparatus comprising:

a demodulating section coupled to receive a modulation signal which is modulated by one of a first modulation system and a second modulation system different from the first modulation system, the demodulating section demodulating the modulating signal with a carrier frequency to output a demodulation signal the demodulation section including:

first demodulating means for outputting first demodulation signals obtained by deciding the demodulation signal with the first modulation system and for outputting first error signals obtained by a decision of the first demodulation signals by the first modulation system, wherein the first error signals represent a distance between a signal point regarding the demodulation signal and a signal point of the first demodulation signals, and second demodulating means for outputting second demodulation signals obtained by deciding the demodulation signal with the second modulation system and for outputting second error signals obtained by a decision of the second demodulation signals by the second modulation system, wherein the second error signals represent a distance between a signal point regarding the demodulation signal and a signal point of the second demodulation signals, and first decoding means for decoding the first demodulation signals supplied from the first demodulating means to output first decoding signals;

second decoding means for decoding the second demodulation signals supplied from the second demodulating means to output second decoding signals;

first selection means, coupled to the first and the second decoding signals, for outputting one of the first decoding signals and the second decoding signals in response to a control signal; and comparing and controlling means, coupled to the first selection means, for comparing respective absolute values of the first error signals and the second error signals, and outputting to the first selection means the control signal so that the first selection means outputs one of the first and the second decoding signals which corresponds to a smaller one of the respective absolute values of the first and the second error signals.

2. A signal demodulating and decoding apparatus according to claim 1, further comprising:

second selection means, controlled by said comparing and controlling means, for selecting one of the first error signals and the second error signals which corresponds to the smaller one of the respective absolute values; and operation means for updating parameters used in said demodulating section, based on the selected one of the first error signals and the second error signals.

3. A signal demodulating and decoding apparatus according to claim 2, wherein said comparing and controlling means effects decision that the modulation system adapted to smaller one of respective absolute values of the first and second error signals is modulation system suitable for the modulation signal.

4. A signal demodulating and decoding method comprising the steps of:

detecting reception signals synchronously by a carrier frequency;

equalizing detection output signals obtained by said detecting step by executing a prescribed operation with prescribed coefficients to obtain first output signals without noise;

executing the prescribed operation with respect to the first output signals and correcting phase deviation of the carrier frequency to obtain second output signals;

effecting a decision of the second output signals at the same time by a plurality of modulation systems which are different from each other, to output a plurality of decision results corresponding to the respective modulation systems and a plurality of error vectors corresponding to the respective modulation systems, wherein each of the plurality of error vectors represent a distance between a signal point regarding the second output signals and a predetermined signal point of a corresponding one decision result in a corresponding modulation system;

decoding the plurality of decision results, respectively, to output a plurality of decoding results;

operating on absolute values of the plurality of error vectors obtained by the effecting step; and comparing the absolute values of the respective error vectors to determine which error vector is of the least absolute value and selecting one of the plurality of decoding results which corresponds to one of the plurality of modulation systems whose error vector is of the least absolute value.

5. A signal demodulating and decoding method according to claim 4, further comprising the steps of:

updating the prescribed coefficients used in the equalizing step by using the error vector having the least absolute value; and extracting angle components from the error vector having the least absolute value and calculating a correction angle to be used in said executing and correcting step.

6. A demodulation apparatus comprising:

a demodulation circuit coupled to receive a modulation signal whose modulation system is changing from a first modulation system to a second modulation system different from the first modulation system in transfer speed of data, signal point arrangement, coding system and reliability of its data transfer, the demodulation circuit demodulating the modulation signal with a carrier frequency to output demodulation data, the demodulation circuit including:

a first decision circuit deciding the demodulation data of the first modulation system and outputting first two-dimensional decision results representing one of signal points defined by a signal point arrangement of the first modulation system and a first error vector representing a distance between a signal point regarding the demodulation data and the first two-dimensional decision results, and a second decision circuit deciding the demodulation data of the second modulation system and outputting second two-dimensional decision results representing one of signal points defined by a signal point arrangement of the second modulation system and a second error vector representing a distance between the signal point regarding the demodulation data and the second two-dimensional decision results;

a first decoder circuit decoding the first two-dimensional results of the decoding system of the first modulation system to output first decoding results;

a second decoder circuit decoding the second two-dimensional results of the decoding system of the second modulation system to output second decoding results;

a control circuit coupled to receive the first and the second error vector and compare absolute values of the first error vector and the second error vector and to output a control signal for selecting one of the first and the second modulation system whose error vector has a smaller absolute value, as a correct modulation system of the modulation signal; and a selector coupled to receive the first and the second decoding results and responsive to the control signal and outputting one of the first and the second decoding results corresponding to the correct modulation system.

7. A demodulation circuit according to claim 6, wherein (i) transfer speed of the data of the first modulation system is slower than that of the second modulation system, and (ii) reliability of the first modulation system is higher than that of the second modulation system.

8. A method of demodulating a modulation signal whose modulation system is changing from a first modulation system to a second modulation system different from the first modulation system in transfer speed of data, signal point arrangement and coding system, the method comprising the steps of:

storing the modulation signal into a RAM;

demodulating the modulation signal with a carrier frequency to output demodulated data;

deciding the modulation data with the first modulation system to output first two-dimensional decision results representing one of signal points defined by a signal point arrangement in the first modulation system and a first error vector representing a distance between a signal point of the demodulation data and the first two-dimensional decision results;

decoding the first modulation signal by the decoding system of the first modulation system to obtain two-bit decoding data;

storing the two-bit decoding data into the RAM;

deciding the modulation data with the second modulation system to output second two-dimensional decision results representing one of signal points defined by a signal point arrangement of the second modulation system and a second error vector representing a distance between the signal point of the demodulation data and the second two-dimensional decision results;

decoding the second modulation signal by the decoding system of the second modulation system to obtain four-bit decoding data;

storing the four-bit decoding data into the RAM;

comparing absolute values of the first error vector and the second error vector in order to select one of the first and second modulation system whose error vector has a smaller absolute value as a correct modulation system of the modulation signal; and selecting one of the two-bit decoding data and the four-bit decoding data as correct transfer data in response to the result of the comparing step.

* * * * *